March 24, 1953 — E. MEYER — 2,632,318
UNIVERSALLY MOVABLE COUPLING HAVING
A FLOATING INTERMEDIATE RING
Filed Nov. 26, 1947
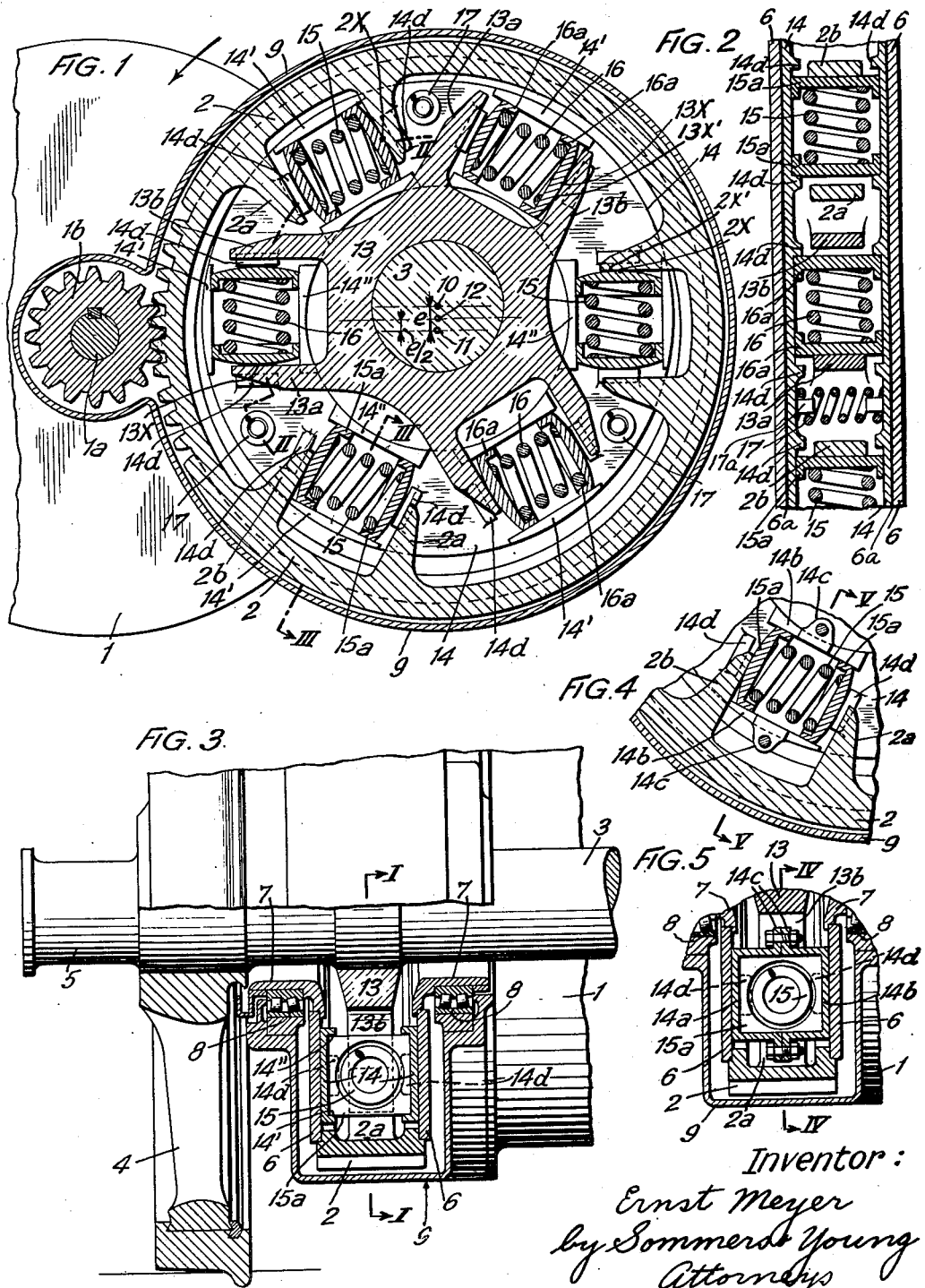
Inventor:
Ernst Meyer
by Sommers & Young
Attorneys

Patented Mar. 24, 1953

2,632,318

UNITED STATES PATENT OFFICE 2,632,318

UNIVERSALLY MOVABLE COUPLING HAVING A FLOATING INTERMEDIATE RING

Ernst Meyer, Winterthur, Switzerland, assignor to Schweizerische Lokomotiv- und Maschinenfabrik, Winterthur, Switzerland Application November 26, 1947, Serial No. 788,297
In Switzerland November 26, 1946

6 Claims. (Cl. 64—27)

My invention relates to improvements in universally movable resilient couplings, wherein the torque is transmitted from one coupled member by spring means onto a floating intermediate ring, and thence over other spring means onto the other coupled member; and the objects of my invention—in particular when applied to a single-axle drive for railway rolling stock—are first to provide for a more simple manufacture, second to afford a better access for the maintenance of the parts and portions subjected to wear, third to prevent the floating ring from "dancing" and thus the occurrence of free mass forces, and fourth to prevent—when the two shafts run eccentrically—the formation of oscillating forces in the direction at right angles to such eccentricity and in the direction of the latter.

I attain these and related objects by the embodiment of such a coupling shown in the drawing, as built into the large gear-wheel appurtenant to an axle of a rail vehicle which is driven by an electric motor.

Fig. 1 shows the coupling in section on line I—I of Fig. 3,

Fig. 2 a developed section through the coupling on the curved line II—II of Fig. 1, Fig. 3 in a somewhat smaller scale, a section on the line III—III in Fig. 1 and partly through one vehicle wheel of the wheel-set driven by the coupling, Fig. 4 a fragmentary section on line IV—IV of Fig. 5 through a minor modification, and Fig. 5 a fragmentary section of the latter on line V—V of Fig. 4.

The motor 1 drives the large gear-wheel 2 by means of a pinion 1b keyed to motor shaft 1a, and wheel 2 in its turn is coupled to the driving axle 3 by means of a resilient coupling built into the wheel, which coupling will be described hereinafter. The axle 3 is carried by the two wheels 4, only one wheel being shown in the drawing, and the axle journal is denoted by 5. The toothed rim of gear wheel 2 is secured to the hub portions 7 by means of the two side discs 6, and mounted for rotation by means of the roller bearings 8 disposed on the said hub portions, in the gear-wheel case 9 which is fixed to motor 1. Gear wheel 2 is permitted to play in a vertical direction relative to axle 3 of the wheel set, and its center 11 may, as shown in Fig. 1, be lower, e. g. by an amount e, than the center 10 of the axle 3. In Fig. 3, however, axle 3 and gear wheel 2 are shown in concentric position.

Gear wheel 2 comprises three pairs of circumferentially spaced radial lugs 2a and 2b, and the follower 13, which is fixed on the axle 3, comprises three pairs of similar spaced radial lugs 13a, 13b. The follower lug-pairs are positioned in the gaps between the lug pairs of the gear wheel. Power is transmitted from the gear wheel lugs onto the follower lugs through the intermediary of three sets of series-connected identical spring elements and of a floating intermediate ring 14 comprised of two annular side plates, each said set comprising a spring element mounted intermediate of a follower lug-pair and a spring element mounted intermediate of a gear wheel lug pair. The spring elements are represented by helical springs 15, 16 mounted intermediate of the spring plates 15a, 16a. The spring plates, of rectangular form, are circumferentially guided (movable in a tangential direction) between the two inside faces of ring 14 and the inner and outer abutments 14', 14" thereof. Such movement, however, is limited by the lateral abutments 14d provided on intermediate ring 14. One half of the number of spring elements are disposed between the lugs 2a, 2b of the gear wheel 2, and the other half between the lugs 13a, 13b, of the follower 13 of axle 3. When no torque is acting onto gear wheel 2, and the driving axle 3 is concentric with the axis of rotation of gear wheel 2 (as shown in Fig. 3), the inside plane faces of lugs 2a, 2b and 13a, 13b on one hand, and those of abutments 14d on the other hand, are disposed in the same planes parallel to axle 3, i. e. the parallel plane inside faces of all the lugs and the spring plate-engaging faces of all the abutments 14d are respectively situated in planes standing at right angles to the plane of drawing in Fig. 1. The spring plates 15a, 16a then are engaged by these said faces under minimum stress. When, however, gear wheel 2 is depressed relative to axis 10 by the amount e, the springs are compressed. One spring plate 15a of spring 15 then is abutted against the lug 2b of gear wheel 2, the other spring plate 15a against the two lateral abutments 14d of intermediate ring 14, one spring plate 16a against the two lateral abutments 14d of intermediate ring 14, and the other spring plate 16a on lug 13a of the follower 13 which is fixed to driving axle 3; which arrangement may be seen in Fig. 2. All of these parts per se give rise to a torque acting on follower 13, which torque, however, is balanced by the counteraction of the other coupling springs. The torque is transmitted from the gear wheel to the follower 13 in a manner quite similar to that just described and as illustrated in Fig. 2. When the wheel 2 is turned by the pinion 1b keyed to the motor shaft, the lug 2b of each pair of lugs 2a, 2b of the wheel 2 acts on the corresponding spring plate 15a and transmits torque by the intermediary of the spring 15 and the second spring plate 15a to one pair of lateral abutments 14d of the floating ring 14, while the next following pair of abutments 14d of the ring acts against a spring plate 16a of the spring 16 which, by the intermediary of a second spring plate 16a acts against the lugs 13a of each pair of lugs 13a, 13b of the follower 13 on the axle 3. Each of the three pairs of lugs 2a, 2b of the wheel 2 transmits torque in the same circumferential direction as described to the follower 13, so that a resulting total torque is obtained. Two springs 15, 16 each then are series-connected. In comparison with the usual spring drive known in the prior art, comprising the same number of springs, the springs of the present drive are engaged by double the force, and their sag is reduced to half.

A closer investigation of the coupling according to the present invention shows that, at a given eccentricity $e$ for the driving axle 3, the center 12 of the floating intermediate ring 14 adjusts itself to half the eccentricity, and that, when gear wheel 2 and axle 3 rotate, intermediate ring 14 will rotate (with the same number of revolutions as the said gear 2 and axle 3) about the said center 12 situated halfway between axle center 10 and gear wheel center 11. Vertical forces of equal magnitude and opposite direction then act from intermediate ring 14 through springs 15 and 16 onto gear wheel 2 and the carriage subframe on one hand, and on the other hand onto driving axle 3. The force engaging the latter acts in an unloading or loading sense onto axle 3, according to whether the gear wheel center 11 is above or below the axle center 10.

The spring coupling according to the present invention has the advantage, in comparison with known prior spring couplings used for the single axle drive of rail vehicles, of being more easily manufactured and more readily accessible for the maintenance of the wearing portions. In comparison with known prior resilient couplings operating as cardan joints, it has the advantage that, in the case of an eccentric running of the coupled shafts 1a and 3, the intermediate ring 14 is not set to dance, and thus no free mass forces are set up. When, in particular, the spring elements 15, 16 are guided between parallel sides of the follower lugs 13a, 13b (which are spaced uniformly over the follower circumference), no oscillating forces are set up, when the two shafts 1a, 3 run eccentrically, in the direction at right angles to such eccentricity nor in the direction of the latter, owing to the adjustment of the intermediate ring as mentioned before.

Further, when mounting the present coupling in a gear wheel (as shown in the drawing), the springs may be housed in a space separated from the gear wheel case so that, upon failure of a spring, no broken parts may enter into the toothing.

Since, as said before, the floating intermediate ring 14 in the eccentric position of the coupled rotating portions rotates about the point in the center 12 of such eccentricity, there arise radial sliding movements of the followers 2a, 2b and 13a, 13b relative to the spring elements 15 and 16, the amount of which is only half of that of known spring couplings which do not comprise an intermediate ring. It, therefore, is possible to design the follower lug pairs 2a, 2b and 13a, 13b so as to abut against the spring elements 15, 16 with plain inside faces, and the spring plates 15a, 16a with arched or crowned outside faces, whereby the helical springs always are loaded in direction of their axes and not eccentrically thereto, thus preventing same from being additionally stressed. Small outward displacements of the points of contact 2X, 13X on the arched spring plates, arising in the transmission of a torque in accordance with the relative distortional angles of the two shafts and the intermediate annular discs, may be compensated in that the points of contact with the plain faces of the follower lugs 2a, 2b and 13a, 13b are moved radially inward to $2x'$ and $13x'$ when the spring elements are not loaded so that for the most frequent common torque, the points of contact fall in the axes of the helical springs.

The two side plates 14a, 14b (Fig. 5) of ring 14 may be interconnected by means of flanges 14c, instead of being disposed independently of each other as in the first example. In the latter case, the two annular side plates 14 are guided only by means of the spring plates 15a, 16a. Friction of the side plates of ring 14 on the lateral discs 6 of gear wheel 2 set up during the play of the coupling, may be produced by the springs 17 (Figs. 1, 2) inserted between the said side walls. These springs are guided by pins 17a fixed to the inside face of the side plates 14a and 14b. Such arrangement may be used for damping the torsional oscillations of the two coupled shafts, and the friction may be still further increased by providing appropriate linings 6a (Fig. 2).

What I claim as new and desire to secure by Letters Patent is:

1. A universally movable resilient torque transmission coupling for shafts subjected to relative oscillations of displacements comprising a large diameter hollow rim wheel having spaced side walls, a driving shaft adapted to drive said wheel, a driven shaft surrounded by said wheel, the latter being carried for rotation independently of the driven shaft, the said wheel having at least three pairs of inwardly projecting spaced lugs, a follower fixed to the driven shaft and having at least three pairs of outwardly projecting spaced lugs, the said pairs of follower lugs being disposed intermediate of the said pairs of wheel lugs, compression springs each loosely disposed in the space inside each pair of lugs and provided with a pair of spring plates, a pair of similar annular discs disposed adjacent the inner face of the said wheel side walls, the said discs having a plurality of inwardly projecting abutments which pairwise are adapted to form a seat or abutment for each said spring plate; the whole in such combination that in operation one lug each of the said wheel lug pairs engages the one spring plate of the said springs intermediate of the said latter lug pairs while the other plate abuts against its appurtenant abutments, and the one plate of the springs intermediate of the said follower lug pairs is engaged by its appurtenant abutments while the other plate abuts against one lug of each follower lug pair.

2. A coupling set out in claim 1, and in which the engaging spring plates are crowned on their outside faces in such manner that the vertex of each crowned face is disposed in the non-loaded or non-operative state of the coupling, such a distance radially inward that, according to the relative distortional angles of the two shafts and the intermediate annular discs under the most frequent loading conditions, the points of contact between the spring plates and the inner face of the respective lugs will be situated on the axes of the respective springs.

3. A coupling set out in claim 1, wherein for the purpose of producing frictional engagement between the inside face of the said wheel sidewalls and the outside face of the said annular discs, a plurality of compression springs are held at right angles to the said discs and disposed circumferentially and intermediate thereof and wherein spring-guiding pins are fixed to the inside face of the said annular discs.

4. A coupling set out in claim 1, wherein the said lugs are provided with parallel opposite faces and the spring plates are crowned on their outside faces which are engaged with the said lugs for loading the helical springs substantially in the direction of their axes, which spring plates hold the said annular discs in spaced parallel relation.

5. A coupling set out in claim 1, and in which the said annular discs are loosely disposed adjacent the inner face of the said wheel.

6. In a coupling set out in claim 1 and for the purpose of increasing the frictional engagement between the inside face of the said wheel sidewalls and the outside face of the said annular discs, a friction lining each disposed between the said inside and outside faces.

ERNST MEYER.

REFERENCES CITED

The following references are of record in the file of this patent:

UNITED STATES PATENTS

| Number | Name | Date |
|---|---|---|
| 1,510,943 | Kjelsberg | Oct. 7, 1924 |
| 2,300,720 | Wooldridge | Nov. 3, 1942 |

FOREIGN PATENTS

| Number | Country | Date |
|---|---|---|
| 254,132 | Switzerland | 1948 |
| 75,906 | Austria | 1919 |
| 281,237 | Great Britain | 1928 |